United States Patent [19]

Ropelato

[11] Patent Number: 4,916,600
[45] Date of Patent: Apr. 10, 1990

[54] MODULAR DEVICE FOR CONTROLLING INDUSTRIAL PROCESSES

[76] Inventor: Michell Ropelato, 22/24, rue Marceau, F-92170 Vanves, France

[21] Appl. No.: 355,058

[22] Filed: May 22, 1989

Related U.S. Application Data

[63] Continuation of Ser. No. 236,083, May 26, 1988, abandoned, which is a continuation-in-part of Ser. No. 588,137, Feb. 6, 1984, Pat. No. 4,771,374.

[30] Foreign Application Priority Data

Jun. 4, 1982 [FR] France ................................ 8209755

[51] Int. Cl.$^4$ ............................................. G05B 19/00
[52] U.S. Cl. .................................. 364/130; 364/131; 364/147
[58] Field of Search ............... 364/130, 131, 147, 200, 364/900

[56] References Cited

U.S. PATENT DOCUMENTS

| 4,171,541 | 10/1979 | Houpt | 364/900 |
| 4,315,315 | 2/1982 | Kossiakoff | 364/300 |
| 4,455,619 | 6/1984 | Masui et al. | 364/147 |

FOREIGN PATENT DOCUMENTS

| 1244277 | 7/1967 | Fed. Rep. of Germany. |
| 3034728 | 5/1981 | Fed. Rep. of Germany. |
| 2456966 | 12/1980 | France. |

Primary Examiner—Allen Macdonald
Attorney, Agent, or Firm—Browdy and Neimark

[57] ABSTRACT

A modular control is built up with a basic module to control a multiplicity of steps, whether successive or simultaneous. Each module controls a step in the overall control process, with a part A which makes a decision for a respective step based on a condition signal CO, and a part D for accordingly controlling as associated action AS. The function provided by the assembled modular control can be represented on a surface as defined by the collection of the front panels of all the modules. This approach to providing control means is particularly useful for a broad range of control technology between hardware logic of elementary logic cells and sophisticated and expensive programmable automatic devices.

12 Claims, 12 Drawing Sheets

MODULAR DEVICE FOR CONTROLLING INDUSTRIAL PROCESSES

This is a continuation of Ser. No. 236,083, filed May 23, 1988, itself a continuation of Ser. No. 588,137, filed Feb. 6, 1984, now U.S. Pat. No. 4,771,374.

The invention relates to a modular control device for industrial processes which is defined by a function chart comprising a multiplicity of steps, successive or simultaneous, interdependent or not.

Such devices ae already known but they are incomplete.

Thus components or simple elementary logic cells are known which are intended to be assembled within an automation control unit, called hardware logic. Each cell allows only one elementary function such as AND, OR, NOT, storage, counting, and time-lag. The extreme simplicity of these devices makes it necessary to have a preliminary analysis done, by an automation specialist familiar with concepts such as Boolean algebra, phase diagrams and truth tables, for any industrial process which is sophisticated in the least and which is to be automated. The embodiment of automation control units of this type, usually with pneumatic or electronic technology, calls upon many links using tubing or wiring which are sometimes numerous enough as to cause very cluttered panels or frames. Breakdown of these systems, finding their defects and eliminating them therefore requires specialists. The high degree of specialization required of the designers, builders and emergency maintenance people for these systems most often leads to significant delays and costs. Using components having elementary logic, although they are simple and inexpensive, therefore rather often leads to costs which ultimately prove to be excessive considering the relative simplicity of the operations to whose automation they contribute.

On the other hand, devices such as programmable automatic devices exist. Their very sophisticated technology, using memories, microprocessors and other powerful computing elements gives them a generally high purchase prices. Furthermore, they most often resort to a programming language requiring the services of computer experts and other specialists able to carry out the process analyses required for using the chosen installations and then, finally, able to monitor and maintain them. These programmable automatic devices are usually designed for automating complicated processes. It must also be noted that for many industrial processes, particularly in small and medium-sized industries, they prove to be much too powerful, and therefore costly, to be reasonably used.

Between these two extremes sequence switches already exist with or without repetitive cycles suitable for controlling a succession of actions. Sequence switches of this kind, on their own, do not however provide the looping, conditional switching, individual time-lags, counts and other operations which are very prevalent in the least sophisticated industrial processes.

It therefore seems that a large gap exists in the range of automation devices corresponding to moderately complex and especially medium-sized industrial processes found in small and medium-sized industries. Using the currently existing devices for their production often leads to overall prohibitive costs which tend to reduce or even prevent the improvement in productivity which could lead to a rational automation of industrial processes in that category of industry and upon which, however, their development and sometimes their survival depend.

The object of this invention is to fill this gap using simple and practical means whose cost is more in line with the size of each problem and accessible, with hardly any difficulties, to the regular staff of industrial firms of every size. This invention proposes, for this purpose, a modular device for controlling an industrial process defined by a function chart including a chain of steps, each step controlled by a module of the type which includes a means (A) for making decisions as a function of a step and a condition signal (CO) in cooperation with a means (D) for controlling an associated action (AS), characterized in that the modules which make the device up consist of volumes with, by analogy with said function chart itself, opposite accesses for exchanging information which at least virtually constitute accesses, for convenience called input accesses, linked to preceding step, and output linked with a subsequent step; with other accesses, for convenience called exchange accesses with other neighboring steps on the function chart and constituting, at least virtually, link interfaces with corresponding modules. Modules organized in this way are suitable for combining by stacking and juxtapositioning in a way similar to that of "bricks" in a structure representative of said function chart.

Ergonomics was taken into consideration during the study and development of this device. In fact, the ability required for using this kind of modular control device is limited to the ability required for establishing a function chart, even simply understanding it.

The representation of the function chart associated with the process to be automated is, according to the invention, advantageously embodied by placing on or opposite an accessible side, especially the front side, of each module or "brick" a diagrammatic illustration of the step associated with it.

According to the invention, on the accessible side of the "bricks" the signalling elements are advantageously arranged which are assigned to the internal functions in relation to the step controlled by the corresponding module and which are arranged according to the diagrammatic illustration of the associated step. It thus becomes possible to follow the course of the process, which can considerably facilitate, if need be, troubleshooting a failure.

Another characteristic of the invention is that on at least some of the front sides of the bricks, manual control elements are provided for the steps controlled by the bricks concerned, which allows manual control in case the modular control device fails.

When, according to the invention, diagrammatic illustrations of the various steps of the process are plotted on a plate, optionally transparent, which covers at least partially the front side of the bricks, holes are advantageously punched at right angles with the signalling elements and/or the manual control elements. This allows reconciling the following of the operations, an optional manual control, and the esthetic facilities that make possible drawing a continuous plane of a function chart. In particular, the invention proposes the use of graphic symbols representing the action elements in place of or in addition to the symbols of the function chart, which makes it easier to understand it. Adding symbols like these is easier than in the case where the function chart is drawn directly onto the front face of the bricks.

In particular, the invention proposes two simple ways of stacking the modules according to which they connect to one another using complementary means of connection carried by their upper, lower or side walls, or they plug into a common support panel.

Due to this arrangement almost in some cases all, indeed all, of the intermodular wiring is eliminated at the time of use. Certain links between nonadjacent modules can be provided advantageously if need be by fill-in modules to which no step has been allocated; their use accentuates the elimination of the intermodular wiring.

As a general rule, the invention proposes a module comprising means for exchanging signals with the preceding and subsequent modules, as well as means for exchanging with juxtaposed modules, upstream and downstream from said means for recognition and interlocking. These exchange means are integrated with the connection means, achieving the reciprocal connection of the modules or plugging them into a support panel. The various interdependent operations among the steps are thus made possible. For this purpose, it is enough to incorporate into the modules, according to the invention, logic elements and/or delay elements.

According to significant characteristics of the invention, a multiplicity of combination elements, such as microswitches, are advantageously provided within the modules to allow each one a choice among various internal operating conditions and/or various possibilities of relations with other modules. These combination means offer the advantage of allowing psuedo-universal modules to be consructed, of which said means of combination constitute the variable psuedo-programming elements as a function of the type of use in the chart to which each module is put. This advantage leads to furnishing only a limited number of different modules; this results in ease in manufacturing, storing, supplying, and using, and therefore reductions in cost.

The objects, characteristics and advantages of the invention come out, moreover, from the following description, given by way of nonlimiting example, with reference to the accompaning drawings.

Figure 1:
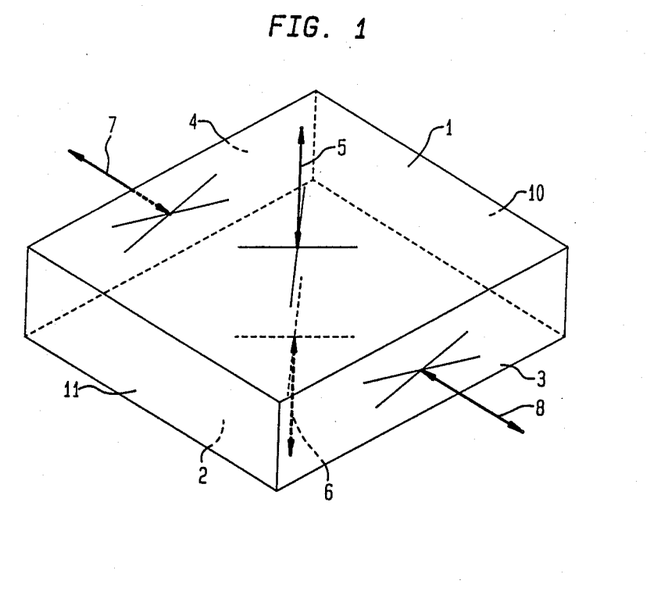
FIG. 1 is a diagram of the overall organization of a module.
Figure 2:
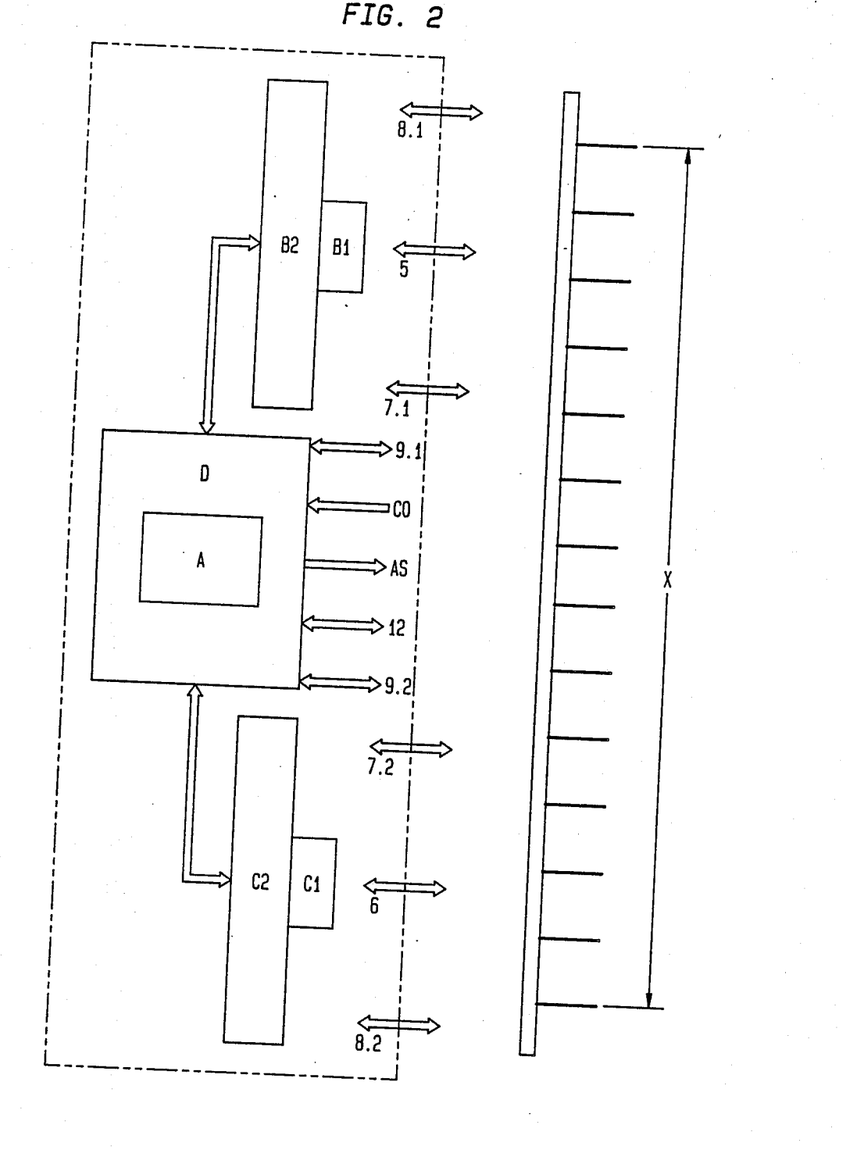
FIG. 2 is a diagram of the internal organization of a module.

FIGS. 1 and 2 illustrate quite diagrammatically the external and internal structures of a module according to the invention. It thus appears that, at least potentially, such a model can be likened to a parallelepiped oriented in space exhibiting upper and lower sides 1 and 2, right and left lateral sides 3 and 4, and rear and front sides 10 and 11. The upper, lower, and lateral sides are each equipped with means for linking with the adjacent modules; means 5 to 8 provide, respectively, the linking of the module with the upper, lower, left, and right modules. In the same vein, any other shape, even cylindrical or spherical, is possible.

As it appears in FIG. 2, these linking means 5 to 8 are connected inside the module to units A, B, C and D. X designates all the links defined by electrical conductor wires, all signal exchanges with other modules and/or with outside units. A decision unit A provides or does not provide the simultaneous recognition of a signal or a step order OE and a condition CO. A processing unit D provides the management of various signals and coordination of the use of various components; in particular it provides the interlocking of an associated action AS. A unit B provides the exchanges of signals occurring upstream from unit D; it is made of an upstream subunit B1 for vertical exchanges which provides, with link 5, the exchanges with the module directly above it and of an upstream subunit B2 for lateral exchanges which cooperates with parts 7.1 and 8.1 of links 7 and 8 to provide the exchange of information with the modules directly adjacent to the right and left. A downstream unit C provides, for its part, the exchanges of signals occurring downstream from units A and D; it is broken down into a downstream subunit C1 for vertical exchanges through link 6 with the module directly below it, and downstream unit C2 for lateral exchanges which, due to parts 7.2 and 8.2 of links 7 and 8, provides the exchanges with the neighboring modules. It should be noted that the unit D cooperates with linking devices 9.1, 9.2 and 12, which are different from those communicating with the neighboring cells, to provide respectively, the link of the module with secondary external events upstream or downstream from the associated action, and with the circuits or power supply common to several modules.

Figure 3:
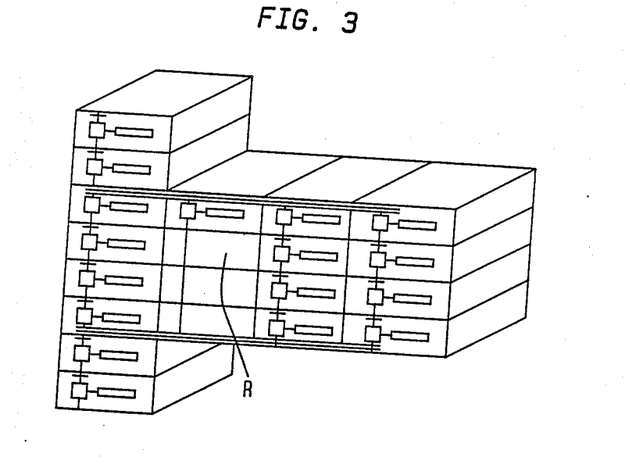
FIG. 3 is a perspective view of a module stack according to a first embodiment.
Figure 4:
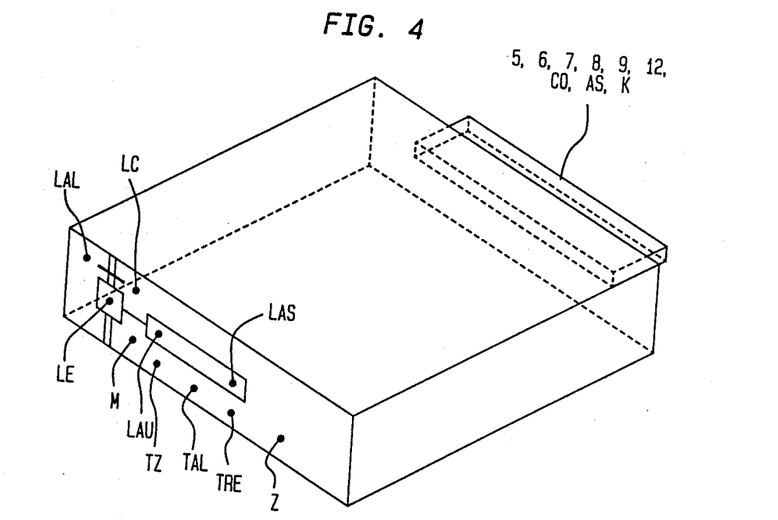
FIG. 4 is a perspective view of a module according to the embodiment of FIG. 3.

FIGS. 3 and 4, on one hand, and 5 and 6 on the other hand, illustrate two kinds of control devices according to the invention corresponding to two different ways of obtaining the stacking of the modules. The modules are represented in the figures as real paralelpipeds, similar to bricks.

FIG. 3 represents a stacking of modules or bricks otained when they are reciprocally plugged in. It appears in FIG. 4 that the linking means or element of a module are thus made up of complementary units for plugging in, strips 7 and 6, and plug slits 5 and 8. The linking means 12 and 9 are composed of a strip projecting on the rear side of the module.

Thus as appears in FIG. 3 and 4, the front side of the modules advantageously carries indications specifying the operation of the module concerned, in such a way as to form, after reciprocal plugging in, a graphic representation of the function chart of the automation constituted by said stacking of bricks. The front side of the module in FIG. 4, moreover, exhibits means for manual operations and signalling in relation to the internal functions of the module. Manual commands M and Z provide starting and stopping of the process at the level of the step under consideration, while the elements TZ, TAL, TRE allow an adjustment of internal elements R1, R2 and R3 whose role, like that of the signalling elements such as LC, LE, LAU or LAS will become apparent later, when FIG. 7 is discussed.

Rather than use wiring, some fill-in bricks R are advantageously placed between certain bricks which are to be connected.

Figure 5:
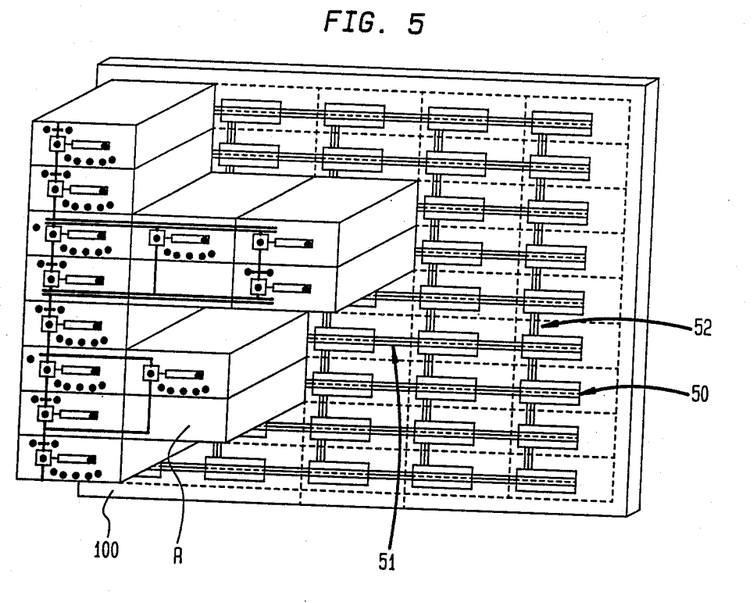
FIG. 5 is a perspective view of a module stack according to a second embodiment.
Figure 6:
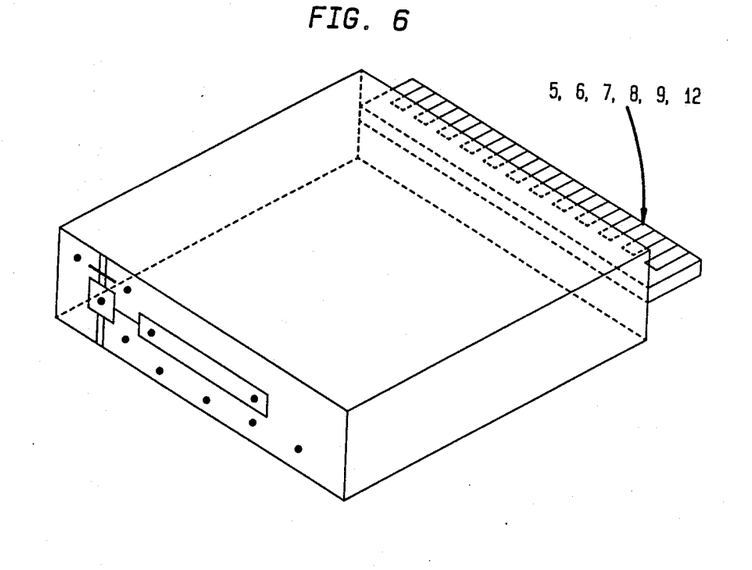
FIG. 6 is a perspective view of a module according to the embodiment of FIG. 5.

FIGS. 5 and 6 represent modules the stacking of which is achieved by plugging into a support 100 by a connection strip 50, which provides all the links 5, 6, 7, 8, 9 and 12, said support exhibiting, for this purpose, connection slits suitably interconnected by connection bundles 51, 52. As above, graphic indications and the signalling elements are advantageously put on the front side of the modules to constitute a graphic representation of the function chart associated with the automation provided by the stacking of the modules. Electric connections on the back of support panel 100 supply the links between modules at a distance (non adjoining) from each other as well as the connection of all the external events.

Figure 7:
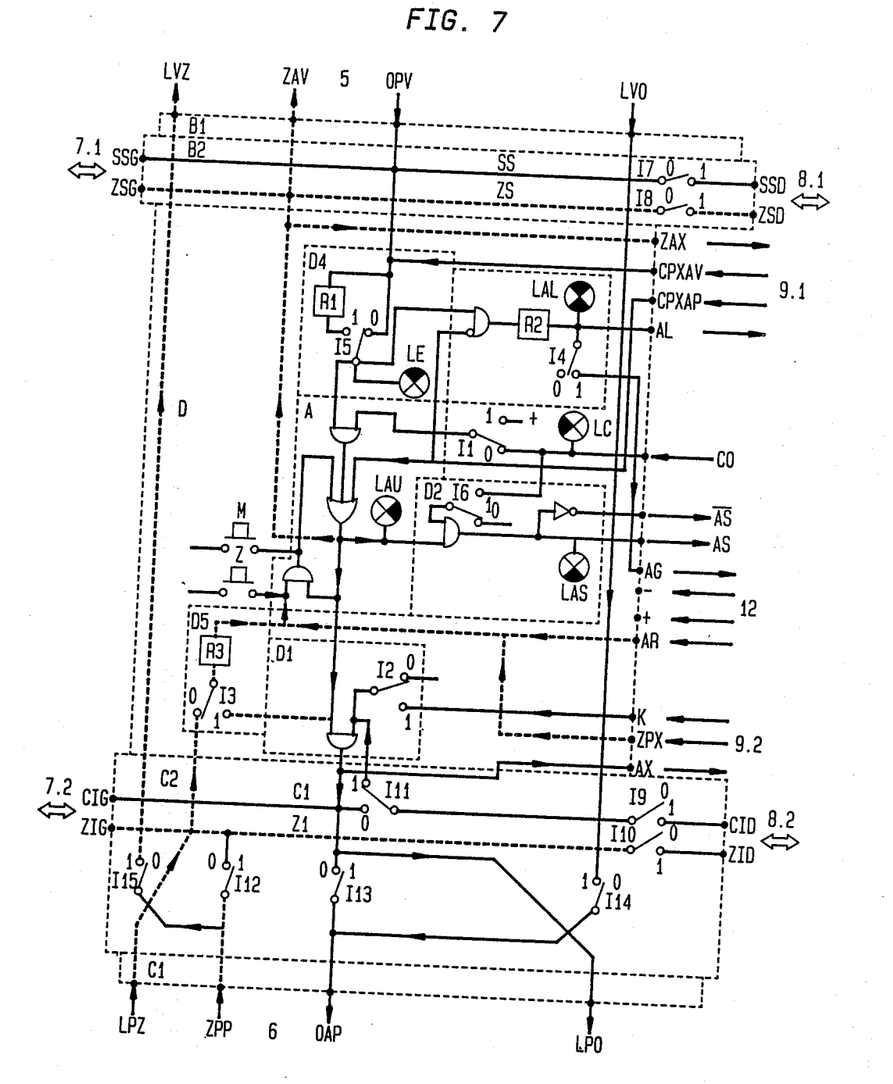
FIG. 7 is a detailed logic diagram in an embodiment of a module according to the invention.

FIG. 7 is a detailed view of the internal structure of a module such as the one diagrammed in FIG. 2. Here a module is involved which could be classified as semi-general purpose because of the presence of micro-switches allowing it to be pseudo-programmed as will be explained later. The structure of the module of FIG. 7 corresponds to an electronic technology and is advantageously embodied, for example, on a printed circuit.

The various elements indicated are cited in relation to FIG. 2.

The subunit B1 for upstream vertical exchanges comprises four connecting pins ZAV, OPV, LVO and LVZ which contribute to link 5.

The subunit B2 for upstream lateral exchanges comprises an initial bus SS, which is connected to pin OPV, and connected to pins SSG and SSD which are for linking to the modules on the left and right. This subunit B2 comprises a second bus ZS connected to pin ZAV and to pins ZSG and ZSD which correspond, respectively, to links with the modules located on the left and right. microswitches I7 and I8, represented near the right external terminals SSD and ZSD on buses SS and ZS, respectively allow, in open position (0), the elimination of any upstream exchange between the module represented and its neighbor on the right. To prevent any exchange with the module on the left, it suffices to have the microswitches it contains in open position (0). The positions "1" correspond of course to the closing of the links, that is, to the possibility of exchanges with the neighboring modules.

On the downstream side of the module, the subunit C1 for donwstream vertical exchanges comprises four connecting pins ZPP, OAP, LPZ and LPO which contribute to link 6. Micro-switches I12 and I13 allow the establishment or interruption of this link 6,, as far as ZPP and OAP are concerned.

The subunit C2 for downstream lateral exchanges comprises an initial bus ZI connected, on one hand, to pins ZPP and LPZ and, on the other hand, to pins ZIG and ZID, corresponding respectively to links with the modules located on the left and right. This subunit comprises a second bus C1 in two connected parts, the first to pins OAP and LPO and to a pin CIG, and the second to pin CID. A microinverter I11 connects, by switching, this second part in two ways: either for direct linkage with LPO, CIG and in cooperation with I13, with OAP, or for connecting it to the input of an AND logic gate which is part of a subunit D1 to be described later. Microswitches I9 and I10 allow the establishment or interruption of link 8.2 with the module located to the right. Pins LVZ and LVO of the subunit B1, on one hand, and pins ZPP and OAP of the subunit C1 on the other hand allow, when micro-switches I14 and I15 are closed (position 1), the establishment of vertical links 5-6 directly between the module preceding the module involved and the following module without it being necessary to employ said module.

The processing unit D includes a delay subunit D4 inserted between pin OPV, connected to a complementary pin CPXAV, and the decision unit A. A microinverter I5 establishes in position 0 a direct link with unit A as well as with an indicator light LE or a lamp showing the step, but in position 1 it activates a time-lag or delay element R1.

The decision unit A comprises, at its input, an AND logic circuit, one of whose inputs is connected to I5, followed by an OR logic circuit. At the input of this latter circuit, besides a complementary pin CPXAP, the output of a second AND logic circuit is connected, one of whose inputs is complemented. The direct input of the latter is connected to the output of the OR logic circuit, while its complemented input is connected to a subunit D5 described below, to pins AR and ZPX and to a push button Z. The output of the OR circuit, or of stage A, is linked to a subunit D1 for order transmission, on the one hand, to pin ZAV and a pin ZAX which is a part of link 9.1 and, on the other hand, to an action subunit D2 and to a push button N connected to a logic value signal 1, formed for example by positive polarity.

To pin OPV, besides D4, the following are connected: an alarm subunit D3 comprising an AND logic circuit one of whose inputs is complemented, followed by a time-lag or delay element R2 connected to pin AL and to an alarm lamp LAL. A microswitch I4 also provides, in closed position (1), the link between R2 and pin AG of an overall centralized alarm. Unit D comprises in addition a pin C0 connected to a condition lamp LC. A microinverter I1 connects the other input of the AND first circuit of the decision unit A and the complemented input of the AND logic circuit D3 to this pin C0 in position 0 and, in position 1, to a permanent logic value signal 1.

Said subunit D1 for order transmission comprises an AND logic circuit, one of whose inputs is connected to the output of unit A. A second input is connected, on one hand, selectively by microinverter I2, to a logic value signal 1 (position 0), or to a pin K (position 1), and on the other hand, to one of the contact studs of said microinverter I11 by way of subunit C2. The output of said AND logic circuit is connected to the other contact stud of I11 and to a pin AX.

The action subunit D2 for authorizing the associated action comprises first of all an AND logic circuit, one of whose inputs, coupled with an indicator lamp LAU for authorization, is linked to the output of unit A while a second input is fed, through microswitch I6, to ssaid terminal C0 (position 1), or to a logic value signal 1 (position O). The output of this AND logic circuit is connected to an indicator lamp LAS for the associated action order to a pin AS and, through a signal inverter, to pin AS.

The reset subunit D5, already mentioned, comprises a time-lag or delay element R3 fed by a microinverter I3, by the output of unit A (position 1), or by bus ZI (position 0). The output of R3 is connected to the complemented input of the AND logic circuit of stage A.

It can be seen that microswitches I1 to I6 allow the pseudoprogramming of the module as a function, the options chosen, according to the positions a user assigns them. Microswitches I7 to I15 provide the links between modules as provided on the function chart. The push buttons are at rest in the open position; they can be closed by pressure, for example, and this corresponds to an unstable position.

In addition, two + and − power supply pins are provided for each module.

Pins ZAX, CPXZAV, CPXZAP and AL correspond to link 9.1, pins AG, +, −, and AR correspond to linke I2, and pins K, AX, and ZPX correspond to link 9.2. Pins C0, AS and AS, corresponding to events outside the module device, are accessible to suitable links.

When operating, a step order OE is transmitted to delay subelement D4, either by pin OPV coming from the preceding module, or by one of pins SSG or SSD of bus SS which makes it possible to provide upper simultaneity with the neighboring modules, either through pin CPXAV in connections with an external event or any other module. Considering the position of I5 as shown in FIG. 7, delay sublement D4 does not cause any time lag. The transmissions of the step order OE to decision stage A is displayed by the indicator lamp LE.

The signal OE is also taken into account by the subelement D3 for relay alarm, at the direct input to its AND logic circuit.

If a condition signal C0 is present at pin C0, in which case lamp LC lights up, it is transmitted by microswitch I1 to a second input of AND circuit of stage A, which then delivers a non-null signal to the input of the OR logic circuit which follows it. The signal C0 is transmitted in parallel to the complemented input of the AND logic circudit of D3 which then stops delivering a non-null signal to the input of R2. This delay element R2 is adjusted as a function of the maximum tolerable time shift between the arrival of signals OE and C0. If C0 is too late, R2 delivers an alarm signal which feeds lamp LAL and terminal AL. If switch I4 is closed (in position 1), the alarm signal is transmitted to terminal AG, then indicating in general the activation of an overall centralized alarm or else, for example, a switching towards another module. Switching microswitch I1 to 1 eliminates any recognition of condition C0 for validating the step order.

The OR logic circuit of stage A is fed either by the preceding AND circuit, by pin CPXAP or by the output of the second AND logic circuit of stage A. When at least one of its three inputs receives a signal, the OR logic circuit simultaneously delivers a signal to subelements D2, which authorizes action,, and D1, which transmits the order; the indicator lamp LAU signals that the associated action is authorized. According to whether or not an external signal is received by pin CPXAV or pin CPXAP, an authorization signal is delivered with or without taking the presence of condition C0 into account. This signal is also received by the second AND logic circuit of A, which, as long as it does not receive a signal at its complemented input, delivers a signal to the input of said OR circuit. The loop of these AND and OR circuits therefore provides a storage effect during which time an authorization signal continues to be delivered even after the signals coming from the first AND circuit or pin CPXAP have disappeared, including after condition C0 has disappeared.

Simultaneously, the transmission signal is transmitted by pin ZAV to the preceding module which receives it through pin ZPP and for which it acts as a reset signal; it is the same for a module further away (nonadjoining) which would be joined to it by pin ZAX, or for the right and left modules next to the preceding module, by upper rreset bus ZS. Taking into account the position of I6, the AND circuit of D2 delivers a signal to pin AS to engage the action associated with the module. The lamp LAS shows that this order has been transmitted. The inverter delivers an inverse associated action order to pin AS. If microswitch I6 is in position 1, the engagement of the associated action by means of the authorizing signal is subordinated to the presence of condition C0 which is then a condition not only for engaging but also for maintaining the associated action. It is then said that the signal in AS is modulated as a function of condition C0. Push button M of D1, instead of stage A, allows an authorization order to be delivered.

Taking into consideration the positions of I2, I11, I19 and I13 shown in FIG. 7, the AND logic circuit of D1 unconditionally transmits the signal for transmitting orders to pins AX, LPO and CIG which are able to retransmit it to, respectively, a nonadjacent module or an external circuit, to the module located below the module situated directly under the module indicated, and to the module to the left, for the purpose of coordinating at a lower location the modules on the same horizontal level. If I13 were in position 0, the signal sent by D1 would also be transmitted to the module directly below it. If I2 and/or I9 were in position 1, the order transmission by D1 would depend on the achievement of an external condition K and/or an order for coordination at the lower level by CID coming from the adjacent module to the right. If I11 were in position 0 and I9 in position 1, the pin CID would deliver a transmission order which would then be directed to pins CIG, LPO and AX of and adjacent module on the right, as well as to microswitch I13; inversely, pin CID could send a signal coming from either D1 or pin CIG.

Above it was described that stage A provides a kind of storage for the step order provided that no signal is delivered to the complemented input of the second AND logic circuit. Thus, any signal received by this input constitutes a reset order. This can also be furnished by pin AR for emergency stopping of the whole device, or by reset terminal ZPX by any module. The reset order can also be obtained by manual action by pressing the push button Z of D5. It should be noted that said resets are carried out without delay. In contrast, in view of the shown position of I3, this order can also come, with a delay, from the lower reset bus Z1. If I12 is in position 0 the reset order can come from the following module. If the inverter I3 is in position 1 the order received from A would cause a delayed reset of the module which would then be capable of an automatic reset. The broken lines in FIG. 7 correspond to the reset links.

In the closed position (1) of the microswitches I14 and I15, pins LVZ AND LVO of subunit B1, as well as pins LPZ and LPO of subunit C1, contribute to skipping the module in question. The step orders and the reset orders are executed directly between the preceding and the following modules. The preceding module sends the step order by its own pin LPO to pin LVO of the module in question, which retransmits it directly by pin OAP to pin OP V of the following module. In the same way, by its pin ZAV, the following module sends a reset order to pin ZPP of the module in question, which retransmits it, by its pin LVZ, to pin LPZ of the preceding module. It should be noted that a total isolation of the module in question requires that microswitches I12 and I13 of this module and of the preceding module be switched to position 1.

It is evident that in place of such a pseudo-programmable module, more simple modules could be used which eliminate or freeze, for example, some links by eliminating microswitches, thus specializing them according to functions specified in the chart.

Other modules could have fewer, or not have at all, time-lag devices or alarms.

Figure 8:
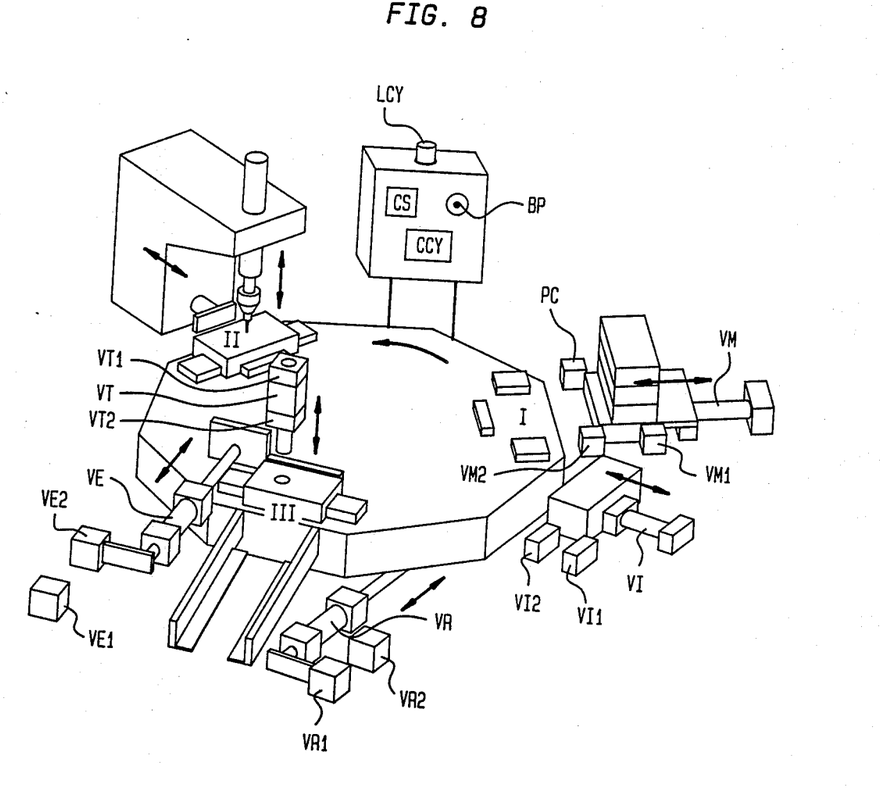
FIG. 8 is a diagrammatic view in perspective of a drilling unit.

FIG. 8 illustrates a drilling installation of which one modular device according to the invention allows, for example, the automation of its operation.

The installation in FIG. 8 comprises three work stations distributed equally around a rotating plate, indexed and moved by two jacks, respectively VI and VR. Each of these jacks is equipped with an end-of-travel contact. Indexes 1 and 2 correspond respectively to the retracted and extended positions of the rods of the jacks. The jacks VR for rotation and VI for indexing cooperate to cause a one-third rotation of the plate.

A control box combines a push button BP, a switch CS for selecting the mode of operation, a cycle counter CCY, and a lamp LCY.

The three work stations (I, II, III) are intended to carry out, in succession, for each piece, its loading, its immobilization by clamping, and its drilling, as well as a test or verification operation before it is removed.

One cycle of operation of the installation comprises sending of a pulse to the cycle counter CCY, followed by the simultaneous action of three work stations on three separate pieces and ends by activating jacks VR and VI which cause the motion and indexing of the rotating plate to change the work site in front of each of the stations.

The operation can be performed in two distinct ways. When operating in cycle by cycle command, the selection switch CS is put in position A and pushing the button BP causes one single cycle, the start of a second requiring another push on BP.

Operating in successive cycles is automatically achieved by moving selection switch CS from position A to position A during a cycle. The opposite action on CS leads to a halt at the end of the cycle in progress at that moment.

The loading station (I) has a feed column and a magazine jack VM which load the pieces to be treated on to the rotating plate. Activating the jack VM depends on closing a contact PC, indicating the presence of a piece to be loaded. The jack VM then engages said piece in a clamp carried on the plate.

After a one-third rotation the loaded piece is placed opposite a gripping jack VS which immobilizes it in its clamp. The drilling operation itself is then executed. The rotation of a pin which has a drilling bit is marked by closing a contact MOT. According yto whether or not a sensor S for detecting the height of the piece marks that the piece to be drilled does or does not exceed, in height, a predetermined value, the operation does or does not include a stage for removal of chips.

Figure 9:
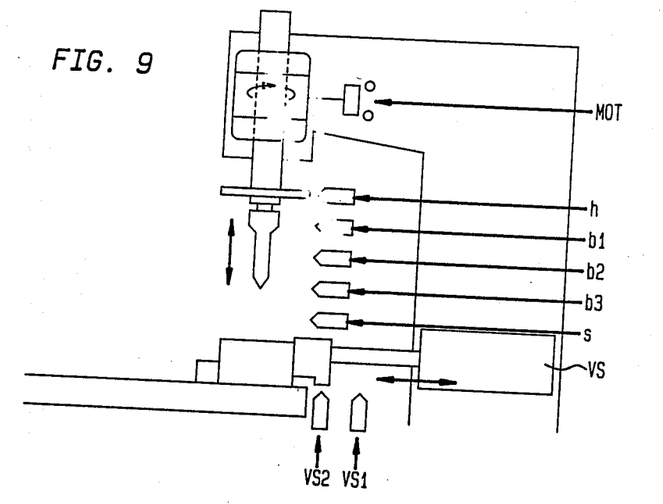
FIG. 9 is an elevation view of the drilling station.

The drilling operation corresponds to vertical movements of the pin, the command and progresses of which are connected to the closure of congtacts h, $b_1$, $b_2$, and $b_3$ shown in FIG. 9. The contacts h and $b_3$ define the high position (waiting) and low position (end of drilling) of the bit. Contacts $b_1$ and $b_2$ correspond, respectively, to positions of approach and removal.

Figure 10:
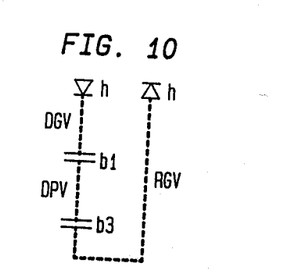
FIG. 10 is an explanatory diagram of a drilling operation without removal of chips.

If the height of the piece is lower than the critical value associated with S, the drilling operation comprises (see FIG. 10) a descent between h and $b_1$ at approach speed or high speed GV, a slow descent between $b_1$ and $b_3$ at a working speed or slow speed PV, then a return at high speed to the high position h. There is no removal of chips.

Figure 11:
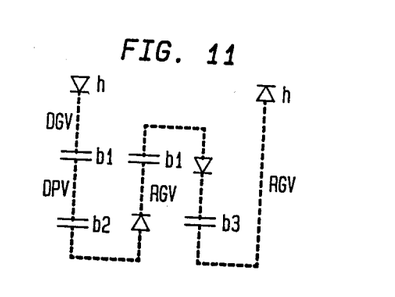
FIG. 11 is an explanatory diagram of a drilling operation with removal of chips.

If the height of the piece exceeds said critical value, after the approach descent at high speed (see FIG. 11), the slow speed descent between $b_1$ and $b_3$ is interrupted at the level of $b_2$. The bit is then lifted at high speed to $b_1$, to remove chips, then is again let down at slow speed to $b_3$.

After drilling, the treated piece is unclamped, then transported one-third of a turn opposite the testing and removal station. A control specimen is pressed into the drilling hole using a test jack VT. If it is pressed into the desired depth, the treated piece, after the control specimen is brought out, is removed by means of a removal jack VE. An alarm goes off if the test station detects a drilling error or if the piece is not correctly removed. The general cycle corresponding to the whole installation is then waiting.

Figure 12:
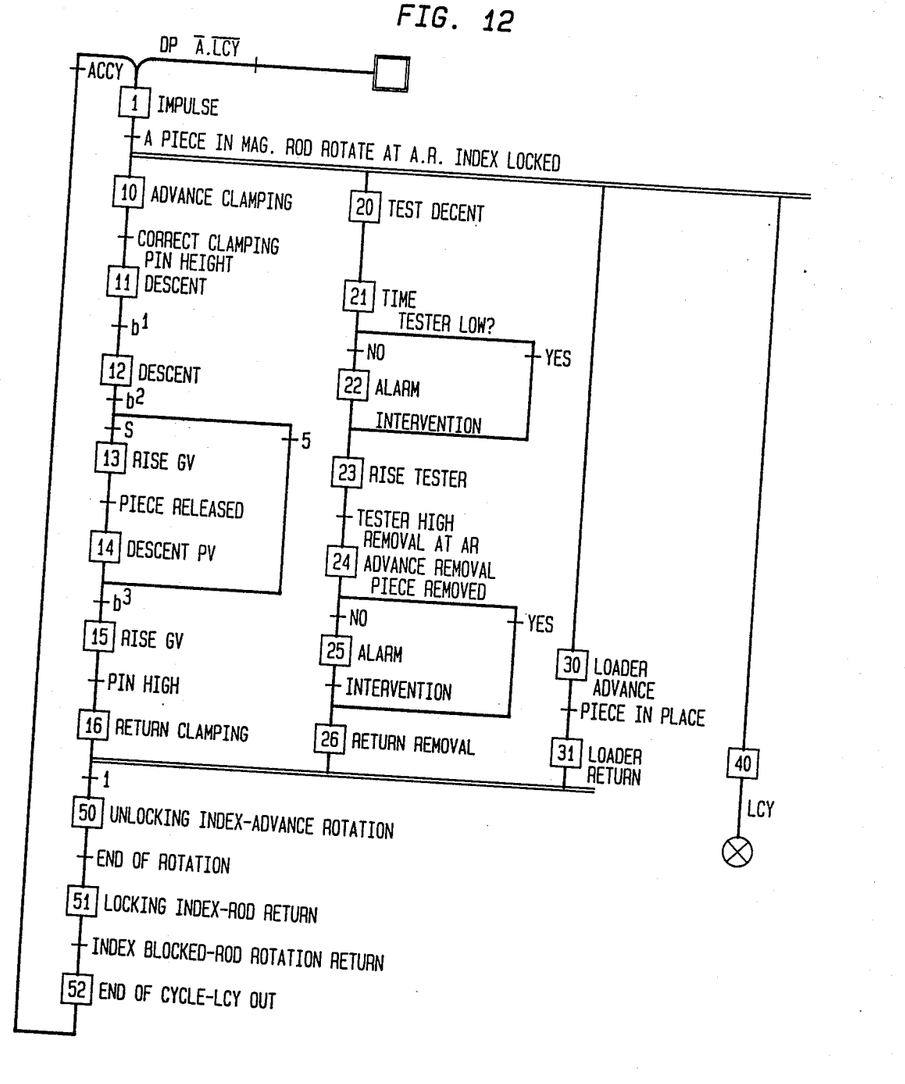
FIG. 12 is a conventional function chart of the drilling unit of FIG. 8.

An initial function chart of the drilling installation, as just described, is shown in FIG. 12. This theoretical chart is, for example, that established primarily for embodying the conditions of the specifications. It is established in particular before deciding which technology to adopt for automating the installation studied.

It can be observed in the chart that the start-up of any cycle operating in a mode of cycle by cycle command is executed by pressing BP, provided that the switch CS is in position A and that lamp LCY, indicating that no cycle is already in progress, is extinguished: (shown by LCY). The first step corresponds to sending a pulse IMP to cycle counter CCY.

Passing to the following steps occurs provided that a piece is loaded (PC), the rod of the rotation jack is retracted (VRI) and that the rod of the indicator jack is extended (VI2). The horizontal double lines correspond to simultaneous actions, the boxes or squares to steps and the horizontal lines to the conditions (C0) required for passing to the following step.

Step 40 corresponds to supplying power to the cycle lamp LCY placed on the box and which, lighted up throughout one cycle, prevents manual start-up of any other cycle.

Steps 30 and 31 correspond to the feeding station. The loader VM advances, it is verified that a piece is in place and then the loader moves back.

Steps 10 to 16 correspondd to the drilling station. The piece is clamped, then there is descent to $b_1$ at high speed, then to $b_2$ at low speed. According to whether or not the height of the piece to be processed is higher (S=1) or lower than the predetermined critical value, a jump to step 15 is or is not carried out, and the descent at low speed to $b_3$ is or is not (jump of 13 and 14) preceded by a rise to high speed until the piece is released ($b_1$=10). Then the pin is made to ascend again, followed by unclamping.

Steps 20 to 26 control the functioning of the testing and removal station. The control descends, there is a time lag of 3 seconds, it is verified that the control has descended to the desired level, (if not an alarm goes off), and then the control ascends. Then the removal jack moves back, the removal is verified with an alarm, and then said jack VE advances.

Steps 50 to 52 take place when all steps 16, 26 and 31 are completed. Here the double lines represent the completion of simultaneous operation at the different stations. The index is released and VR advances, the index is stopped and VR moves back, and lamp LCY goes out. The cycle is finished.

A second function chart (FIG. 13) based on the preceding one, takes into account the possibilities offered by the modules according to the invention. It includes only 15 steps instead of the 21 steps of FIG. 12.

Figure 13:
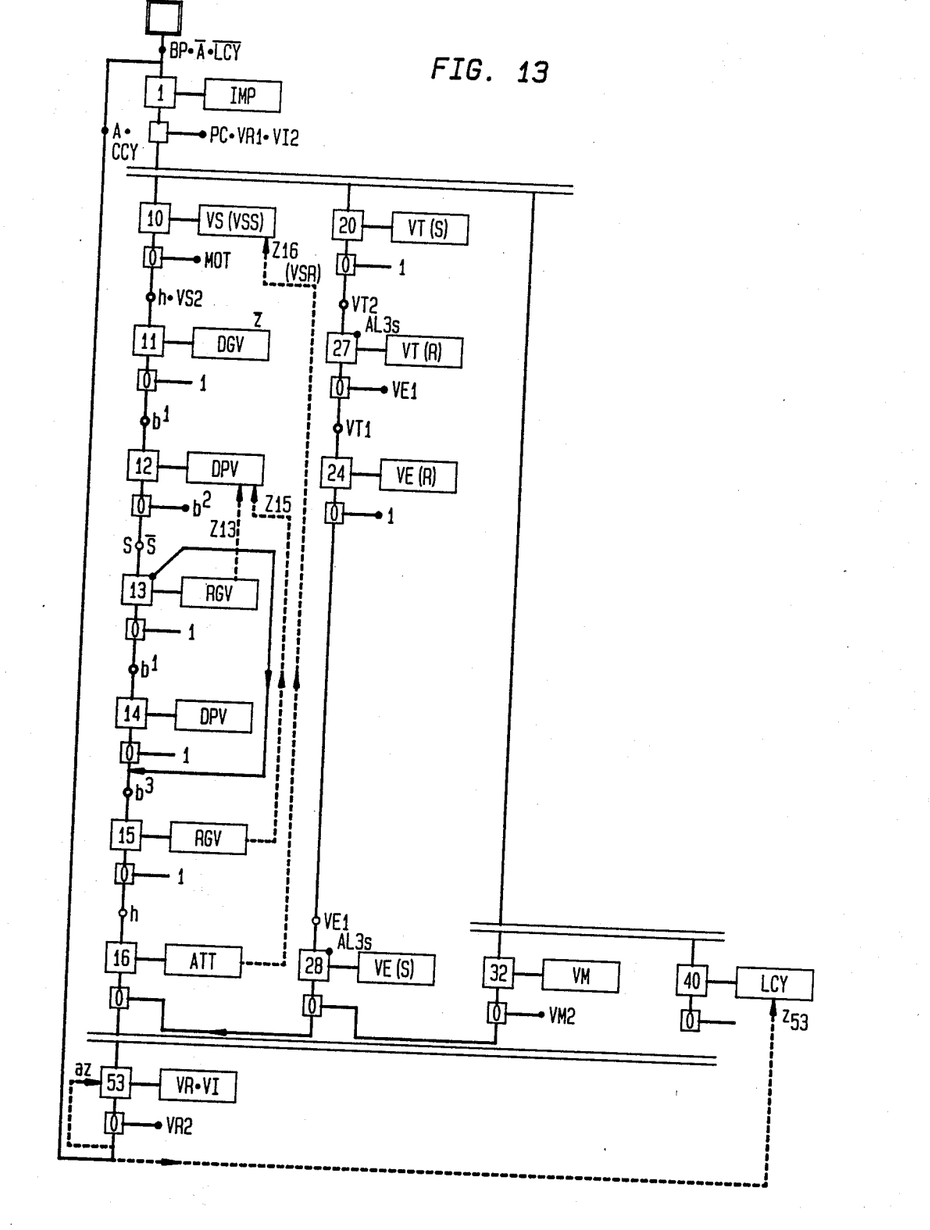
FIG. 13 is a version of the function of FIG. 12, arranged for using the invention.

Thus steps 21, 22 and 23 are combined into one single step 27 and steps 25 and 26 are combined into one step 28. Steps 30 and 31 for the entry and exit of the rod of VR are combined into one step 32. Steps 50 to 52 for the end of the cycle, connected to the movements of the rods of VR and VI, are condensed into one step 53. The small squares with a small circle beneath each step correspond to conditions for transmitting the order for the end of the step, while the small circles are the conditions for the recognition of a step order by a subsequent step. The broken lines indicate, as above, reset links.

Figure 14:
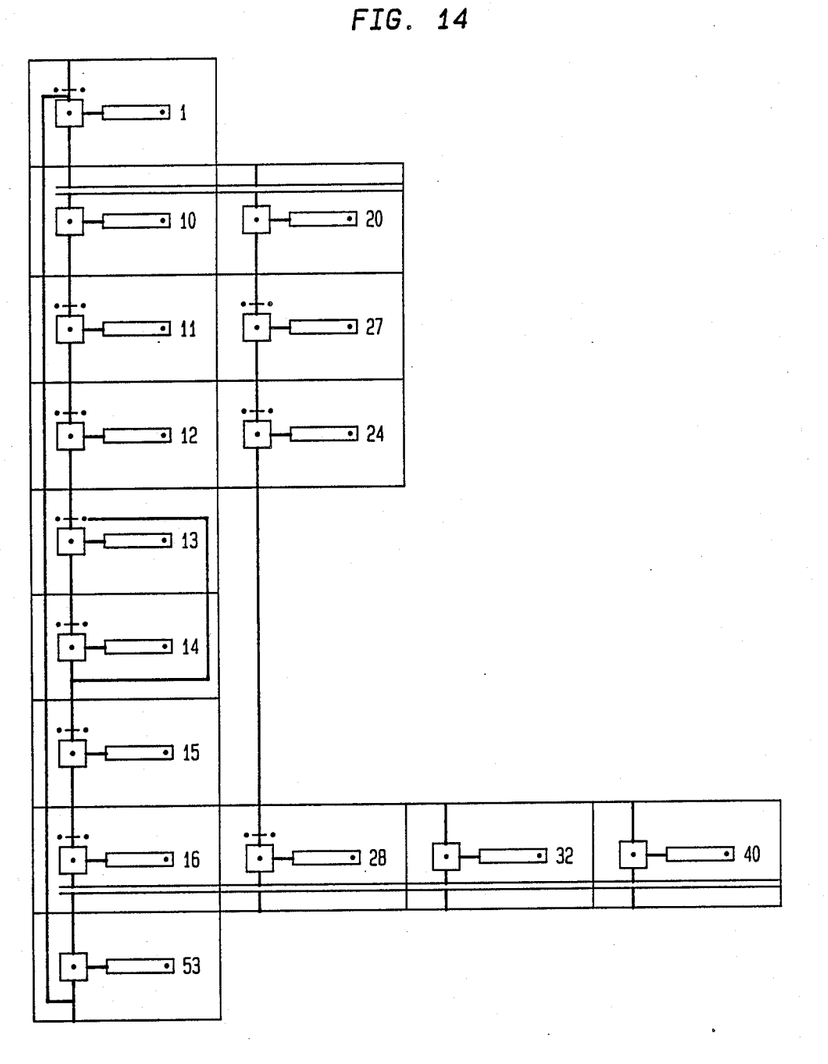
FIG. 14 is a diagrammatic view of a stack of modules associated with the function chart of FIG. 13.

FIG. 14 shows the stacking of modules which corresponds to the function chart of FIG. 13, the numbers here being posted on the corresponding modules. The conditions associated with the squares with a small circle, on the one hand, and with the small circles, on the other hand, are recognized respectively by pins K and C0 of the associated modules. It should be noted that when no condition at all is to be taken into considerstion by K, the digit 1 placed near the small square with a small circle indicates that a logic signal 1 has been applied, by microinverter I2 for example.

Figure 15:
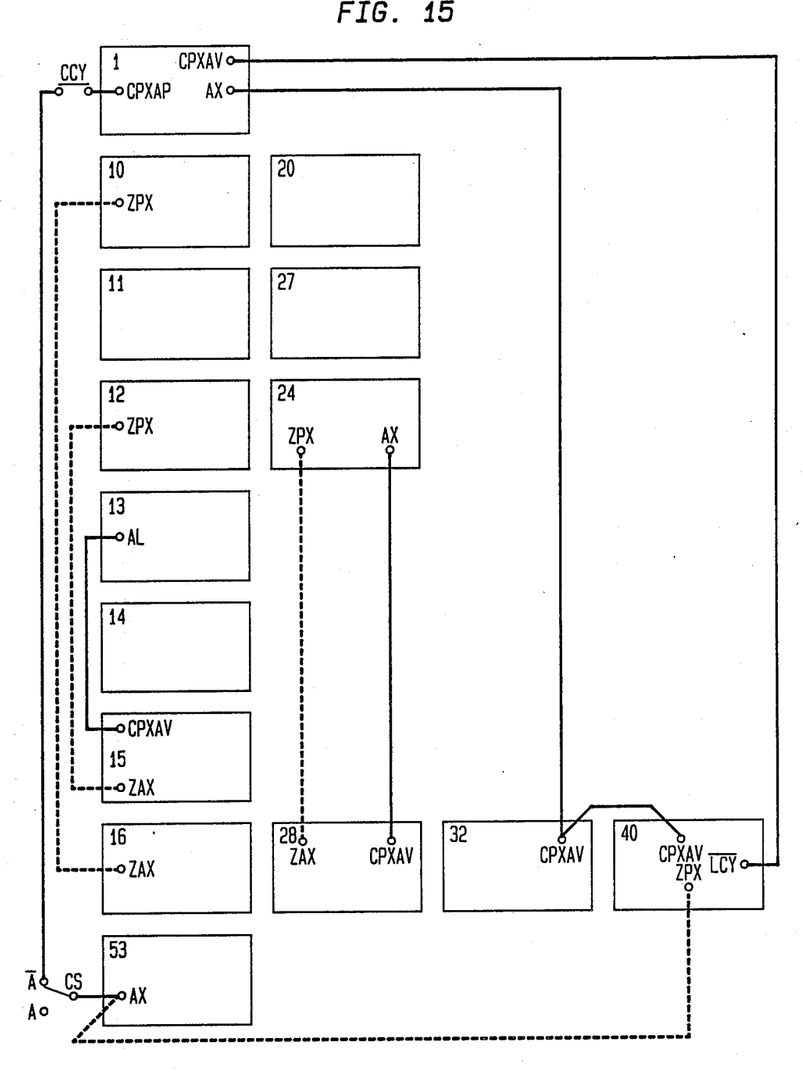
FIG. 15 is a wiring diagram of the few intermodular links present according to the stacking in FIG. 14.

The details of some rare intermodular links to be made by virtue wiring are shown in FIG. 15 and the pins they connect are specified. These links seldom involve two adjacent modules; the links between these latter (adjacent modules) are actually, in principle, automatically established during the simple operations of assembling the modules, during their stacking. In certain cases it can be advantageous to eliminate all or part of the several wiring sections thanks to the use of very simplified fill-in modules such as those shown (reference R) in FIGS. 3 and 5. In the case of stacking modules which can be plugged in reciprocally, the use of such fill-in bricks, even stripped of any role as an electric link, makes it possible to assure good mechanical sturdiness of the unit. In the case of stacking plug-in modules on a common support 100, such modules are advantageously scaled down, practically, to their plug-in part, arranged accordingly. It should be noted that the fill-in modules, by their front side, are advantageously a part of the graphic representation of function chart associated with the stack.

Figure 16:
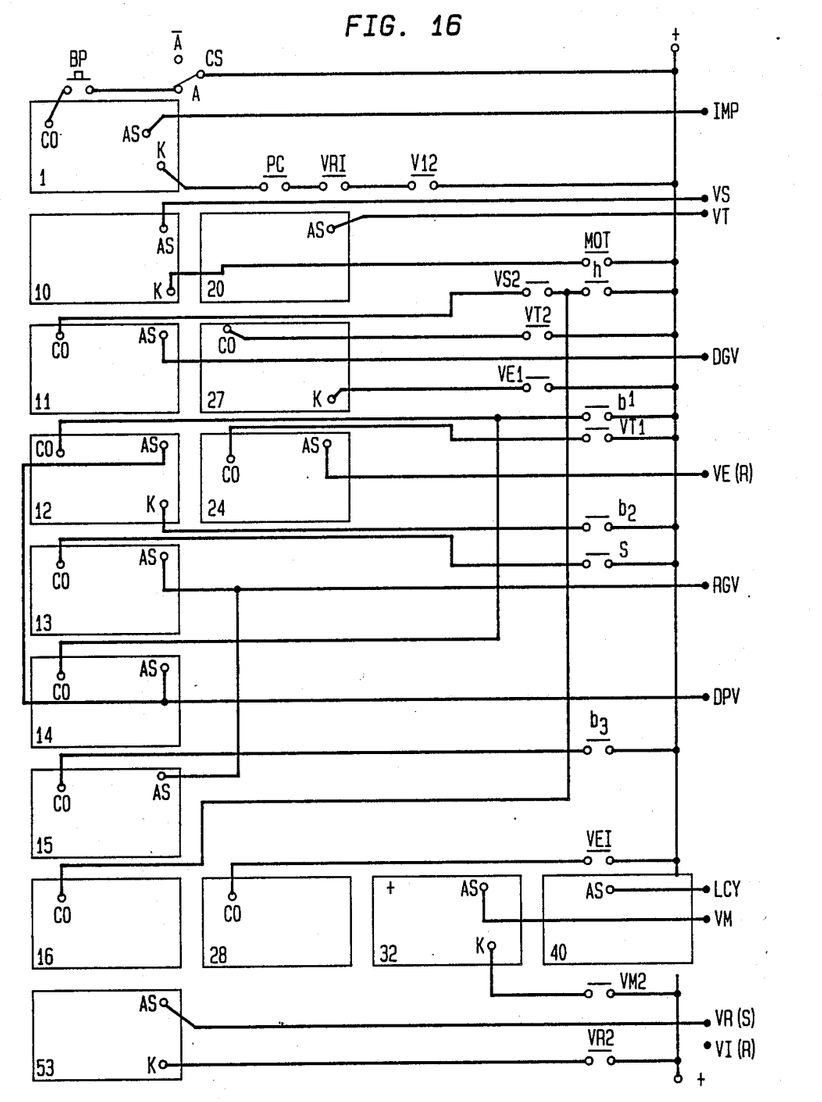
FIG. 16 is a diagram showing the connection with external events which is embodied according to the stacking in FIG. 14.

FIG. 16 completes FIG. 15 since it indicates the connection (by wiring) of the environmental elements allowing the recognition of conditions of the type C0 or K, and the control of associated actions of type AS.

It thus appears from examining FIGS. 15 and 16, in accordance with the function chart of FIG. 12, that, for example, the sending by module 1 of an impulse IMP to said cycle counter takes place only if it receives at its terminal CPXAV a signal indicating that module 40 has stopped lighting lamp LCY of the cycle in progress and if it receives in parallel at C0 a signal corresponding to the pressing of push button M for initiating a cycle under manual control. For the following cycle, if inverter A/A is switched over to automatic operation, sending of the impulse rresults from CPXAP receiving a signal from module 53 that the preceding cycle has finished. The transmission of the step order to the following modules depends on the simultaneous closing of the contacts PC, VI1 and VI2, which causes a non-null signal to arrive at K from a source with non-null potential.

It can also be verified that the connection of the other modules allows the control of the function chart of FIG. 12.

It goes without saying that the embodiments illustrated by the preceding figures were described only as examples and that numerous variations can be proposed by a man of the art without thereby going outside the scope of the invention.

Thus the parallelepiped form of the bricks which is particularly advantageous in the case of plug-in modules is well suited to assure the embodiment of a function chart including rows and columns oriented in two opposite directions. If need be any other embodiment of the bricks can be retained.

Moreover, the industrial process studied by way of example is of the logical or digital type. Any other industrial process could be controlled by the modules according to the invention by inserting analog-digital converters in predetermined locations within the modules, for example, between the modules and external signal transmission elements, or between modules.

Many current or future technologies can be adapted for all respects of the invention, both from the point of view of the components themselves and their use. The example of electronic technology described here does not constitute a limitation.

The internal functions of each module can be combined according to need; furthermore, several types of pseudo-programmable modules can exist which correspond to varying degrees of complexity, size and cost. On the other hand, module types can comprise one or more microprocessors or even other complementary elements of the "memory" category, whose object is precisely to generate the internal functions of the module. Said internal functions can be numerous, even complex. Power, isolation or amplification elements can also be integrated into the modules without going outside the scope of the invention.

The graphic representation of the function chart can be made easier by covering the stack of modules, at least partially, with a plate, opaque or not, punched with holes at the locations of elements for manual intervention and signalling elements.

The specific graphic symbols of the associated actions can be put next to or in place of the symbols of the function chart.

In addition, the modules can be equipped with connection means for remote duplicating of the display signals and the manual intervention means.

It should be noted that the modules which have just been described are suited for embodying all ranges of function charts, from the most complicated to the most simple. By its structure, comprising, besides unit A for recognizing a step signal and a condition C0, a unit D for engaging an associated action comprising subunits D1, D2, D3, D4 and D5, a module according to FIG. 7 proves to be perfectly suited to providing, by itself, simple automation of the type, for example, of controlling, from a single pulse, the extension of the rod of a jack, followed immediately by its return; units B and C for upstream and downstream exchanges are then of course useless.

All said variations for units A and D of FIG. 7, for example their switches I1 to I6, are, of course, also applicable to independent devices of this type, while their shell and their layout are then no longer subject to any stress.

It goes without saying that the invention also encompasses, for modules themselves as new industrial products, those modules suitable for working within a modular control device of the type which has just been described with its means A,B,C, and D.

Furthermore, it should also be noted that previously a step order OE was always mentioned which was received by an independent module or device intended to be directly recognized by the delay subunit D4 and the alarm subunit D3. As these subunits were described, this order must be sent over a period sufficient to let it be recognized at the same time as the validation condition (C0). It should be noted that the devices according to the invention can be suited to recognizing transient step orders provided that it stores them using a memory advantageously integrated upstream from subunits D3 and D4. In the case of a modular arrangement, keeping the preceding step can thus be avoided during the waiting time of the validation condition (C0) for the step order.

It can also be noted that several modules can be solidly associated with a possible decrease in the volume allocated to each one, intermodular links being embodied or not within the unit.

I claim:

1. Device for controlling an industrial process, regrouping as a whole the functions of the type necessary for the processing of the action of one single activator, said control device comprising a module comprising an integral collection of primary stages required for directing the functional sequences of said activator, said integral collection comprising a decision mechanism (A) depending on an incident order and a condition (C0), cooperating with an associated action (AS) driver (D), wherein said driver (D) comprises:

an order transmission subunit (D1) adjusted to subordinate the transmission of a signal to authorize the engagement of the associated action from decision mechanism (A) to an outside event (K);

an action subunit (D2) adjusted to subordinate the order to engage the associated action to validation condition (C0), an alarm subunit (D3) adjusted to detect the presence of the incident order and validation condition (C0), advantageously comprising a delay component (R2) in order to produce an alarm and/or switching signal depending on whether or not condition (C0) is present before a predetermined period of time after the incident order arrives elapses;

a delay subunit (D4) adjusted to defer the acceptance of the incident order by decision mechanism (A);

a reset subunit (D5) adjusted to reset the device to its resting state, selectively simultaneously with the transmission of the stage signal by the control device to one or a plurality of other control devices, either as a result of a signal originating from the one or the plurality of other control devices or of outside occurrences;

a connector subunit of one or a plurality of parts designed to establish links (5, 6, 7, 8) for exchange of a first set of various emitted or received signals (LVZ, ZAV, OPV, LVO, SSG, ZSG, SSD, CIG, ZIG, CID, ZID, LPZ, ZPP, OAP, LPO) with a contiguous identical control device as well as other links (9, 12) for exchange of a second sset of signals (ZAX, CPXAV, CPXAP, AL, AG, AR, K, ZPX, AX) with other identical control devices.

2. Device according to claim 1, wherein a representation of the overall functional diagram is defined by a group of fragmented schematic illustrations, each corresponding to one stage, and included on or opposite a side of the module dedicated for driving said stage, each of said schematic illustrations thus supplementing said signaling mechanism.

3. Device according to claim 1, characterized by the placement, on at least some of the modules, of connectors for the purpose of remote signal repetition or of remote control, as a functional supplement or replacement for those in claim 1.

4. Device according to claim 1, characterized by the incorporation within the drivers (D) of at least some of the modules, of the order transmission subunit (D1), adjusted to subordinate the transmission of the stage signal from decision mechanism (A) to an outside event (K), especially the reception of a stage signal from another module.

5. Device according to claim 1, characterized by the incorporation within the driver (D) of at least some of the modules, of the alarm subunit (D3) adjusted to detect the presence of the accepted stage signal and of the validation condition (C0), advantageously comprising the delay component (R2) for producing an alarm and/or switching signal, depending on whether or not condition (C0) is present before a predetermined period of time after the stage signal arrives has elapsed.

6. Device according to claim 1, characterized by the incorporation, upstream from delay (D4) and alarm (D3) subunits, of memory to accept the incident stage order.

7. Device according to claim 1, characterized by the incorporation into said reset subunit (D5) of a delay component (R3) in order to defer the module reset for a given period of time.

8. Device according to claim 1, characterized by the incorporation into the drivers (D) of at least some modules, of configuration units, especially selection elements, adjusted to allow a selection of different operating modes, for each of the modules equipped.

9. Device according to claim 1, wherein, for at least some of the modules, the mechanisms for exchanging signals (B2, C2) with the juxtaposed modules are endowed with configuration units especially selection element I7 to I15, adjusted to allow a selection of different possible connections with associated modules, for each module thus equipped.

10. Device according to claim 1d, characterized by at least one module being logic-driven.

11. Device according to claim 1, characterized by at least one module being numeric-driven.

12. Device according to claim 1, characterized by at least one module being microprocessor-driven.

* * * * *